United States Patent
Yamamoto

(10) Patent No.: US 7,637,644 B2
(45) Date of Patent: Dec. 29, 2009

(54) VEHICLE LAMP HOUSING AND COVER WITH WELDING SURFACE STRUCTURE

(75) Inventor: Akinori Yamamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 154 days.

(21) Appl. No.: 11/545,868

(22) Filed: Oct. 11, 2006

(65) Prior Publication Data
US 2007/0081352 A1  Apr. 12, 2007

(30) Foreign Application Priority Data
Oct. 11, 2005  (JP) ............................. 2005-296402

(51) Int. Cl.
*F21V 15/01* (2006.01)
(52) U.S. Cl. .................... 362/546; 362/507; 362/362
(58) Field of Classification Search ................ 362/507, 362/546, 362
See application file for complete search history.

(56) References Cited

U.S. PATENT DOCUMENTS

| | | | | |
|---|---|---|---|---|
| 4,601,927 | A * | 7/1986 | Durfee ........................ | 428/543 |
| 5,893,959 | A * | 4/1999 | Muellich .................. | 156/272.8 |
| 6,464,374 | B2 * | 10/2002 | Akiyama et al. ............. | 362/267 |
| 6,478,451 | B2 * | 11/2002 | Akiyama et al. ............. | 362/267 |
| 6,592,239 | B1 * | 7/2003 | Akiyama et al. ............. | 362/267 |
| 7,153,010 | B2 | 12/2006 | Yamada et al. | |
| 7,287,877 | B2 * | 10/2007 | Yasuda et al. ................ | 362/267 |
| 7,329,025 | B2 * | 2/2008 | Yasuda et al. ................ | 362/267 |
| 7,345,258 | B2 * | 3/2008 | Yasuda et al. ........... | 219/121.63 |
| 7,357,543 | B2 * | 4/2008 | Ikeda et al. .................. | 362/507 |
| 2004/0200569 | A1 * | 10/2004 | Weiblen et al. .......... | 156/272.8 |
| 2005/0024888 | A1 | 2/2005 | Otani et al. | |
| 2005/0030751 | A1 * | 2/2005 | Matsunaga et al. .......... | 362/267 |
| 2005/0225991 | A1 * | 10/2005 | Yamazaki et al. ........... | 362/362 |
| 2006/0077681 | A1 * | 4/2006 | Ikeda et al. .................. | 362/546 |

FOREIGN PATENT DOCUMENTS

| | | |
|---|---|---|
| JP | 2001-243811 | 9/2001 |
| JP | 2001-243812 | 9/2001 |
| JP | 2005-259620 | 9/2005 |
| KR | 2005-53028 A | 6/2005 |

OTHER PUBLICATIONS

Korean Office Action issued in Korean Application No. 10-2006-0097842 mailed on Feb. 29, 2008 and English translation thereof, 6 pages.
Abstract of JP2005259620 published on Sep. 22, 2005, Data supplied from the *esp@cenet* database—Worldwide, 2 pages.
Abstract of JP2001243811 published on Sep. 7, 2001, Data supplied from the *esp@cenet* database—Worldwide, 2 pages.
Abstract of JP2001243812 published on Sep. 7, 2001, Data supplied from the *esp@cenet* database—Worldwide, 2 pages.
European search report for patent application No. 06121934.1, Mailed Jun. 16, 2008, 9 pages.

* cited by examiner

*Primary Examiner*—Ismael Negron
(74) *Attorney, Agent, or Firm*—Osha • Liang LLP

(57) ABSTRACT

A vehicle lamp has a housing and a transparent cover formed of a transparent resin having a flexural modulus of 2000 MPa or more, and joined to the housing by beam welding. The transparent cover has a first surface and a second surface. The second surface faces the housing, and a welding surface is formed along a circumference of the second surface. The welding surface is formed such that the welding surface has a three-dimensional curved surface in a closed-curve form, and such that each continuing surface of the welding surface is formed as a flat surface with respect to a direction of a normal line thereto or as a curved surface having a curvature radius of 30 mm or more with respect to a direction of a normal line thereto.

8 Claims, 3 Drawing Sheets

Prior Art

VEHICLE LAMP HOUSING AND COVER WITH WELDING SURFACE STRUCTURE

BACKGROUND OF INVENTION

1. Field of the Invention

The present invention relates generally to a vehicle lamp. Specifically, embodiments of the present invention relate to an art for surely performing welding in a vehicle lamp in which a housing and a transparent cover provided in front thereof are joined by beam welding.

2. Description of the Related Art

For vehicle lamps, there exists an art of beam welding in which a transparent cover provided in front of a housing is welded onto the housing by irradiation of a beam, such as a laser beam. In joining the housing and the transparent cover by use of beam welding, there are many advantages that cannot be obtained in other joining techniques such as heat plate welding, ultrasonic welding, or bonding.

Meanwhile, in order to surely perform beam welding, the housing and the transparent cover must be placed in close contact at their welding surfaces, and a gap between the welding surfaces must be held within 0.1 mm.

In an effort to place the housing and the transparent cover in proximity with a gap of 0.1 mm or smaller or in close contact at their welding surfaces, it is a common practice to precisely perform a die cutting, an injection condition setting, etc. upon injection-molding of the housing and the transparent cover.

However, it is difficult to actually eliminate post-injection-mold shrink, deflection, deformation, etc., and it is inevitable to encounter regions having a gap of 0.1 mm or greater. Therefore, poor welding results in such regions.

For this reason, there has been an attempt to fix the housing and push the transparent cover toward the housing by a jig so that a forcible deformation can be caused by an external force upon irradiation with a beam, thereby placing both welding surfaces in close contact together at the time of beam welding.

As mentioned above, the housing and the transparent cover can be placed within a gap of 0.1 mm at their welding surfaces in most of the regions by pushing the transparent cover toward the housing with a jig and causing a forcible deformation to the transparent cover by an external force. However, when the transparent cover 70 has a region 75 where a direction of a normal line n1, n2 to the welding surface 73 changes sharply as shown in FIG. 5, structural rigidity in that region increases. In such regions, it is not easy to place the welding surfaces of the transparent cover 70 and the housing 60 within a gap of 0.1 mm even if pushed by a jig.

SUMMARY OF INVENTION

Embodiments of the present invention surely perform beam welding by making a gap between a transparent cover and a welding surface of a housing within 0.1 mm, even for a transparent cover that has a welding surface formed to have a three-dimensional curved surface in a closed-curve form.

According to a first aspect of one or more embodiments of the invention, a vehicle lamp includes: a housing; and a transparent cover formed of a transparent resin having a flexural modulus of 2000 MPa or more, and joined to the housing by beam welding, wherein the transparent cover has a first surface and a second surface, the second surface faces the housing, and a welding surface is formed along a circumference of the second surface, further wherein the welding surface is formed such that the welding surface has a three-dimensional curved surface in a closed-curve form, and such that each continuing surface of the welding surface is formed as a flat surface with respect to a direction of a normal line thereto or as a curved surface having a curvature radius of 30 mm or more with respect to a direction of a normal line thereto.

Therefore, the welding surface of the transparent cover is free of any region where rigidity extremely increases due to a shape of the welding surface. Thus, even where there is a slight gap between the welding surfaces of the housing and transparent cover in a post-mold state, the welding surface of the transparent cover can be placed into close contact with the welding surface of the housing, or the gap can be reduced to 0.1 mm or less by externally applying pressure to the transparent cover and deforming the welding surface. Consequently, heat sufficiently conducts to the welding surface of the housing during beam welding, and welding is surely performed.

According to a second aspect of one or more embodiments of the invention, the transparent cover may have a wall thickness of 4 mm or less in a region where the welding surface is formed. Therefore, when the transparent cover is pressed toward the housing by a jig or the like so as to apply an external force, the welding surface of the transparent cover easily becomes deformed and fits well to the welding surface of the housing. Namely, the welding surface of the transparent cover can be placed into close contact with the welding surface of the housing, or the gap can be reduced to 0.1 mm or less. This allows heat to sufficiently conduct to the welding surface of the housing during beam welding, and welding is surely performed.

According to a third aspect of one or more embodiments of the invention, the welding surface may slightly project with respect to the second surface adjacent thereto. This makes it possible to provide a reference line in a position between a die surface corresponding to the welding surface and other part of die surface, the reference line being used when polishing a die surface into a mirror surface in a region corresponding to the second surface of the transparent cover where the welding surface is not formed. Therefore, workability in a polishing work improves.

According to a fourth aspect of one or more embodiments of the invention, an on-housing welding surface, to which the welding surface of the transparent cover is to be welded, may be formed on the housing, and the on-housing welding surface may be formed such that the on-housing welding surface has a three-dimensional curved surface in a closed-curve form, and such that each continuing surfaces of the on-housing welding surface is formed as a flat surface with respect to a direction of a normal line thereto or as a curved surface having a curvature radius of 30 mm or more with respect to a direction of a normal line thereto. Therefore, the welding surface of the transparent cover having a shape which corresponds to the welding surface of the housing is readily placed in close contact with the welding surface of the housing. Even if there is a gap, the gap can be reduced to 0.1 mm or less.

Other aspects and advantages of the invention will be apparent from the following description and the appended claims.

DETAILED DESCRIPTION

Figure 1:
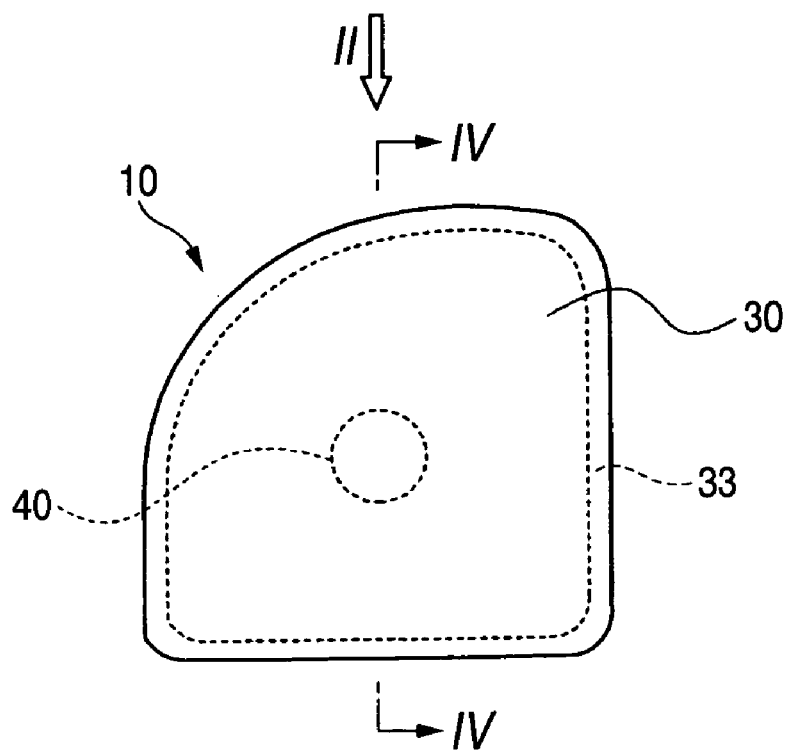
FIG. 1 is a schematic front view showing a vehicle lamp according to an exemplary embodiment of the present invention.
Figure 2:
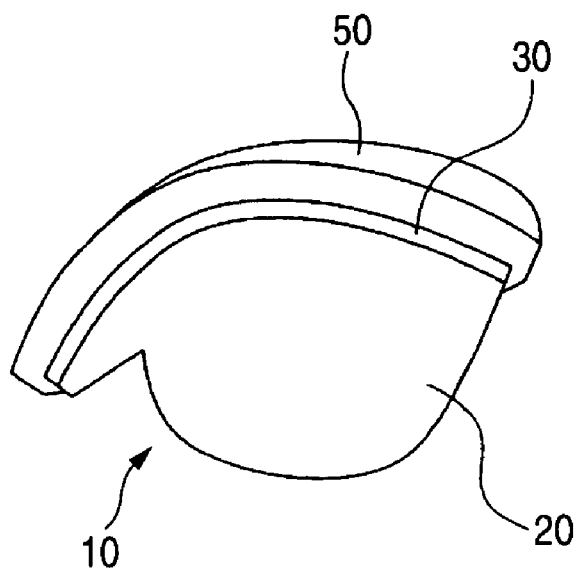
FIG. 2 is a side view showing a state in which a transparent cover is pressed toward a housing by a holding jig, as viewed in the direction of arrow II in FIG. 1.
Figure 3:
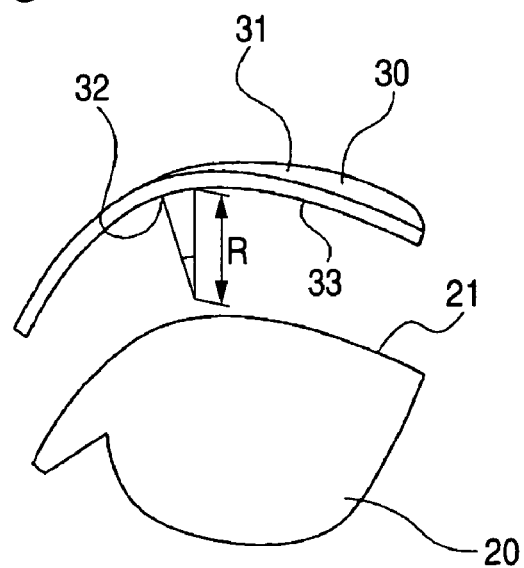
FIG. 3 is a side view showing the transparent cover that is separated from the housing, as viewed in the same direction as in FIG. 2.

Exemplary embodiments according to the present invention will be described below with reference to the drawings.

A vehicle lamp 10 is constructed such that a transparent cover 30 is joined to a vessel-like housing 20 so as to cover a front opening of housing 20, and a light-source bulb 40 is disposed in a lamp space 11 defined by the housing 20 and the transparent cover 30.

The transparent cover 30 is joined to the housing 20 by beam welding in which welding is performed by irradiation of a beam, such as a laser beam.

Figure 4:
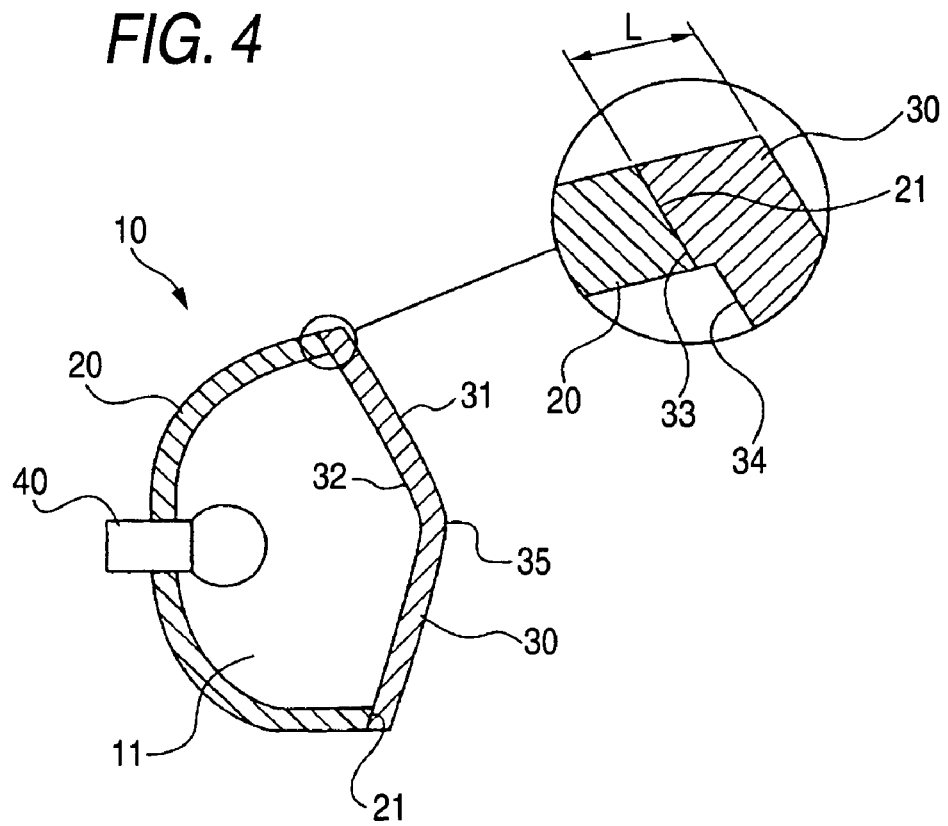
FIG. 4 is a sectional view taken along line IV-IV in FIG. 1.
Figure 5:
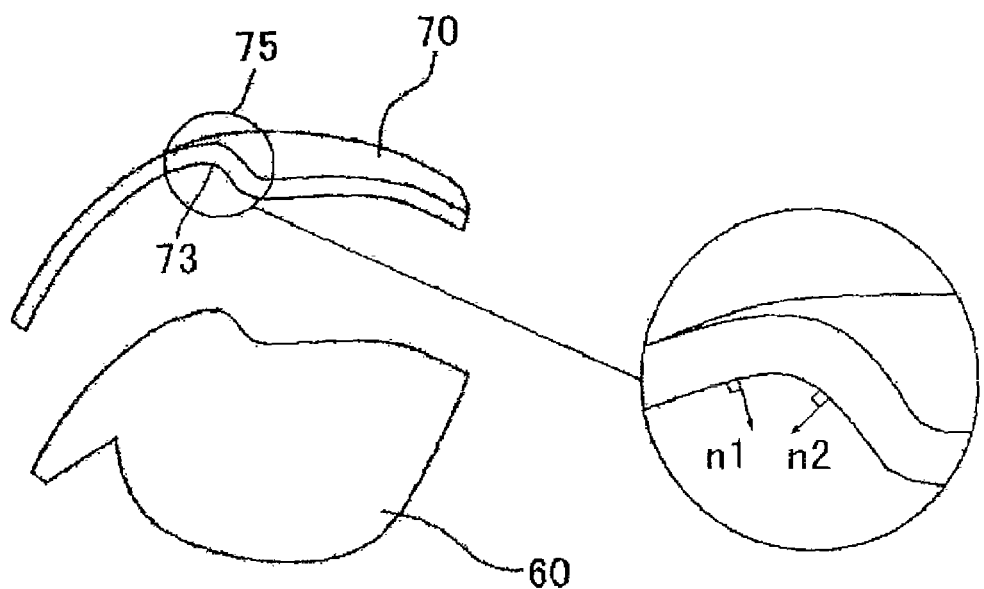
FIG. 5 is a side view showing the transparent cover and the housing of the related art.

The transparent cover 30 is formed of a transparent resin having a flexural modulus of 2000 MPa or more, e.g. acrylic resin or polycarbonate (PC), to have a first surface 31 facing outside and a second surface 32 facing the housing 20. A welding surface 33 is formed along a circumference of the second surface 32. The welding surface is formed is formed such that the welding surface has a three-dimensional curved surface in a closed-curve form, and such that each continuing surface of the welding surface is formed as a flat surface with respect to a direction of a normal line thereto or as a curved surface having a curvature radius R of 30 mm or more with respect to a direction of a normal line thereto. The transparent cover 30 has a wall thickness L of 4 mm or less in a region the welding surface 33 is formed. The welding surface 33 slightly projects with respect to the other region 34 (see magnification view in FIG. 4). The reason for providing the wall thickness L of 4 mm or less in the region where the welding surface 33 is formed is to prevent rigidity in the region where the welding surface 33 is formed from being increased. The reason for providing the welding surface 33 so as to slightly protrude with respect to the other region 34 is to provide a reference line in a position between a die surface corresponding to the welding surface and other part of die surface, and to improve the workability of polishing work, wherein the reference line is used when polishing a die surface into a mirror surface in a region corresponding to the other region 34 of the second surface 32 of the transparent cover 30 where the welding surface 33 is not formed.

The housing 20 has an opening edge on which an on-housing welding surface 21 directing substantially toward the front direction is formed. The on-housing welding surface 21 is formed such that the on-housing welding surface has a three-dimensional curved surface in a closed-curve form, and such that each continuing surface of the on-housing welding surface is formed as a flat surface with respect to a direction of a normal line thereto or as a curved surface having a curvature radius of 30 mm or more with respect to a direction of a normal line thereto.

The housing 20 and the transparent cover 30 are joined together in the following manner.

At first, the housing 20 is placed on a fixing jig (not shown) such that the opening side is faced up. Then, the transparent cover 30 is put on the housing 20 such that the on-housing welding surface 21 faces the welding surface 33 of the transparent cover 30. With a holding jig 50 being placed on the transparent cover 30, pressure is applied to the transparent cover 30 through the holding jig 50 in a direction toward the housing 20. Even where there is a slight difference in contours between the welding surface 33 of the transparent cover 30 and the on-housing welding surface 21, the welding surface 33 of the transparent cover 30 becomes deformed so as to conform to the on-housing welding surface 21 due to the pressure applied through the holding jig 50. Therefore, the welding surface 33 is placed, in its entire surface, into close contact with the on-housing welding surface 21. Even if there is a portion where the welding surface 33 is not in close contact with the on-housing welding surface 21, the gap therebetween is 0.1 mm or less.

The holding jig 50 is formed of a wholly transparent material or of a material transparent at least in a portion corresponding to the welding surface 33 of the transparent cover 30.

As noted above, the welding surface 33 of the transparent cover 30 is placed in close contact with or in proximity, interposing a slight gap (0.1 mm or less), to the on-housing welding surface 21, and a beam such as a laser beam is irradiated by a beam radiator (not shown), e.g., a laser head, to the on-housing welding surface 21 through the holding jig 50. Due to a beam irradiation, the on-housing welding surface 21 enters an excited state and generates a heat. If the resin material of the housing 20 is less absorbent of beam energy, a material well absorbent of beam energy may be applied to, or deposited on, the on-housing welding surface 21. On the contrary, beam-transmissive regions of the transparent cover 30 and holding jig 50 are preferably formed of a material less absorbent of beam energy irradiated.

As described so far, when the on-housing welding surface 21 is caused to generate heat by irradiating a beam from the beam radiator, the heat generated is conveyed to the welding surface 33 (surface that is in contact with the on-housing welding surface) of the transparent cover 30. The both welding surfaces 21, 33 are heated into a co-fused state. Thus, the resin materials of the housing 20 and transparent cover 30 are united together in an interface of contact between the two welding surfaces 21, 33. In such manner, the transparent cover 30 and the housing 20 are united together by beam welding.

In the vehicle lamp according to one or more embodiments, a preferable close contact of the transparent cover with the on-housing welding surface can be obtained even if the transparent cover is large in size by setting a shape of the welding surface so as not to provide a region where structural rigidity locally increases. Therefore, a welding is surely performed.

Incidentally, it is the welding surface that is required not to provide a region where rigidity locally increases. Therefore, even if there is a curved region having a curvature radius of 30 mm or smaller in the other regions, e.g. in any other region except for the welding surface 33 such as the region 35 shown in FIG. 4, the effect of embodiments of the invention is not affected.

The shapes and structures shown in the figures are merely exemplary embodiments of the invention. The technical scope of the invention is therefore not limited by the exemplary embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The present invention claims foreign priority from Japanese patent application no. 2005-296402, filed on Oct. 11, 2005, the content of which is incorporated herein by reference.

What is claimed is:

1. A vehicle lamp comprising:

a housing; and a transparent cover formed of a transparent resin having a flexural modulus of 2000 MPa or more, and joined to the housing by beam welding, wherein the transparent cover has a first surface and a second surface, the second surface faces the housing, and a welding surface is formed along a circumference of the second surface, wherein the welding surface is formed such that the welding surface has a three-dimensional curved surface in a closed-curve form, and such that each continuing surface of the welding surface is formed as a flat surface with respect to a direction of a normal line thereto or as a curved surface having a curvature radius of 30 mm or more with respect to a direction of a normal line thereto, and wherein a circumferential edge of the welding surface is three-dimensionally curved, and at least a portion thereof has a curvature radius substantially less than infinity.

2. The vehicle lamp according to claim 1, wherein an on-housing welding surface, to which the welding surface of the transparent cover is to be welded, is formed on the housing, and the on-housing welding surface is formed such that the on-housing welding surface has a three-dimensional curved surface in a closed-curve form, and such that each continuing surface of the on-housing welding surface is formed as a flat surface with respect to a direction of a normal line thereto or as a curved surface having a curvature radius of 30 mm or more with respect to a direction of a normal line thereto.

3. The vehicle lamp according to claim 1, wherein the welding surface projects with respect to the second surface adjacent thereto.

4. The vehicle lamp according to claim 3, wherein an on-housing welding surface, to which the welding surface of the transparent cover is to be welded, is formed on the housing, and the on-housing welding surface is formed such that the on-housing welding surface has a three-dimensional curved surface in a closed-curve form, and such that each continuing surface of the on-housing welding surface is formed as a flat surface with respect to a direction of a normal line thereto or as a curved surface having a curvature radius of 30 mm or more with respect to a direction of a normal line thereto.

5. The vehicle lamp according to claim 1, wherein the transparent cover has a wall thickness of 4 mm or less in a region where the welding surface is formed.

6. The vehicle lamp according to claim 5, wherein an on-housing welding surface, to which the welding surface of the transparent cover is to be welded, is formed on the housing, and the on-housing welding surface is formed such that the on-housing welding surface has a three-dimensional curved surface in a closed-curve form, and such that each continuing surface of the on-housing welding surface is formed as a flat surface with respect to a direction of a normal line thereto or as a curved surface having a curvature radius of 30 mm or more with respect to a direction of a normal line thereto.

7. The vehicle lamp according to claim 5, wherein the welding surface projects with respect to the second surface adjacent thereto.

8. The vehicle lamp according to claim 7, wherein an on-housing welding surface, to which the welding surface of the transparent cover is to be welded, is formed on the housing, and the on-housing welding surface is formed such that the on-housing welding surface has a three-dimensional curved surface in a closed-curve form, and such that each continuing surface of the on-housing welding surface is formed as a flat surface with respect to a direction of a normal line thereto or as a curved surface having a curvature radius of 30 mm or more with respect to a direction of a normal line thereto.

* * * * *